Patented June 22, 1943

2,322,274

UNITED STATES PATENT OFFICE 2,322,274

MAGNESITE FOR FURNACE LININGS

Raymond E. Birch and Clyde L. Thompson, Mount Lebanon, Pa., assignors to Harbison-Walker Refractories Company, Pittsburgh, Pa., a corporation of Pennsylvania No Drawing. Application December 4, 1940, Serial No. 368,500

6 Claims. (Cl. 106—58)

This invention relates to magnesite refractory for use in constructing and patching industrial furnace parts such, for example, as open hearth furnace bottoms, converter linings, and the like, all of which are, for brevity of reference, to be taken as included in the term furnace linings as used herein.

Magnesite has been used almost exclusively for constructing basic furnace linings, the properties which adapt it to such uses being so well known as to require no detailed discussion here. To prepare magnesite for such use it is calcined to the extent known as dead burned. For general use in constructing bottoms and linings such dead burned magnesite is usually sold in the form called grain magnesite, which is a mixture of coarsely to finely granular material, e. g., typically grains from about ⅝ inch diameter to very fine particles. For making certain rammed linings, laying up banks of bottoms, patching, laying of magnesite brick, and similar purposes, the dead burned magnesite is usually sold in finely ground condition known as furnace magnesite. All such types of magnesite used for constructing and preparing furnace linings are contemplated by the present invention.

Up to the time of the World War magnesite mined in Austria was largely used for these purposes. During and since the war, domestic magnesites have, however, largely supplanted the use of imported magnesites for such purposes, it having been found that the natural sintering properties of the Austrian magnesites could be reproduced by the addition of certain materials, notably iron oxide, to the magnesite before burning.

Although magnesites of desired sintering qualities and adapted fully to the construction of furnace linings are thus provided by domestic supply, it has been found that in some instances or for some purposes domestic magnesites are not fully satisfactory, even when corrected for sintering properties. Thus, a common practice in using refractory magnesite, as in patching linings of some furnaces, is to mix the magnesite with sodium silicate to prepare it for use. The purpose of the sodium silicate is to cause the mixture to set up quickly and to afford a temporary bond until sintering has occurred. Although Austrian magnesites seem generally to be suited to such uses, setting up with sodium silicate in a very few hours, it has been found that some domestic magnesites set very slowly, in fact objectionably so. For instance, where an Austrian magnesite will set up in the course of a very few hours, such domestic magnesites may require as much as twelve hours for setting up even though they are perfectly satisfactory as regards their sintering properties when heated. Attempts to correct this deficiency in various ways have been unsuccessful. This characteristic is undesirable because in patching a furnace it is desirable, for reasons well known in the art, to return the furnace to operation in the shortest possible time.

It is among the objects of the invention to provide magnesites for use in furnace linings which set quickly with sodium silicate, to do so easily and cheaply, and by using commonly available materials, and to do so without detrimentally affecting the desirable properties of magnesite.

A particular object is to provide satisfactorily quick setting magnesite compositions with magnesites of unduly slow setting properties.

Yet another object is to provide furnace linings that are easily and quickly made from magnesites which are normally slow setting with sodium silicate.

We have discovered, and it is upon this that our invention is predicated, that the setting up rate of magnesites with sodium silicate may be accelerated substantially by admixture of the burned magnesite with free lime. Stated otherwise, we have discovered that when a dead burned magnesite which sets up slowly with sodium silicate is mixed with a small proportion of free lime, the mixture will set up much more rapidly. Thereby it is possible to use such magnesites for purposes for which they have not been adapted, and for which foreign magnesite has been preferred.

For the purposes of the invention the magnesite should be mixed with more than about 0.5 per cent by weight of free lime, and most suitably that there should be present at least about 1 per cent by weight. Our experiences to date indicate that as the content of free lime is increased up to about 3 per cent, the setting time with sodium silicate is progressively increased. The setting time of a mixture containing about 5 per cent of lime is approximately that of one containing 1 per cent of lime. For the latter reason and because excessive amounts of lime are often considered to be undesirable in magnesite furnace linings, it is preferred that the mixtures provided by the invention contain not over about 5 per cent of free lime. We believe now that for most purposes mixtures containing from about 1 to about 3 per cent of lime provide the most satisfactory results.

The magnesite and the lime should be intimately mixed so that when the sodium silicate solution is added the effect of the lime will be uniformly exerted throughout the batch. Hence it will usually be desirable to use the lime in finely divided form.

As evidencing the benefits to be derived from the invention, reference may be made to tests by a method similar to that applied by one user of magnesite for the patching of copper converter linings. In accordance with that test magnesite and sodium silicate mixtures having about the consistency of mortar are molded in wooden boxes of 9 x 4 x 4 inches size which are then heated in a dryer at 275° F. At one-hour intervals the mixes are examined and a screwdriver is applied to the top crust to determine how well setting has progressed.

In one particular test a control mix was made from dead burned magnesite of slow setting character, and sodium silicate sold by the Philadelphia Quartz Company as "N" brand, which is a liquid sodium silicate containing about 8.9 per cent of $Na_2O$, 29.0 per cent of $SiO_2$, and about 62.1 per cent of water, the ratio $Na_2O$ to $Si_2O$ being substantially 1 to 3.25. There were made up also mixes from the same sodium silicate and the same magnesite containing, respectively, 1 per cent, 3 per cent and 5 per cent by weight of free lime. After the mixes had been molded in boxes and heated for 1 hour examination showed that the control mix was soft whereas all three of the lime-containing mixes were well set. That containing about 3 per cent of lime was set somewhat better than the other two, it being difficult to push the screwdriver through it. After 2 hours heating all of the lime mixes were set fairly hard while the control mix was still soft.

In another test a mixture of slow setting magnesite and 1 per cent of lime was brought to a consistency described as slop molding with sodium silicate, and the batch was then molded in a box of 9 x 4.5 x 4 inches size. Without previous drying the filled box was then placed on top of a furnace. After a time the box caught fire and was partially burned away. The mix had been converted into a hard and dense brick which exhibited no substantial change in volume. Magnesite not containing free lime treated in the same manner exhibits considerable swelling under the same circumstances, with production of a porous product of low bulk density. This test was conducted at a copper works where the slow setting time of patching mixes of magnesite and sodium silicate was seriously objected to, the operators expressed satisfaction with the tests and indicated that the material would meet their requirements.

This property of substantially accelerating the setting up of magnesite with sodium silicate is apparently unique to lime. Thus, we find by actual test that other calcium salts such, for example, as calcium carbonate and plaster of Paris, do not accelerate the setting time. Various other materials which we have tried, such as sodium carbonate, sugar, barium and strontium carbonates, caustic magnesia, and salt cake, either exerted no appreciable accelerating effect, or they actually retarded setting. And some actually enhanced swelling, which is highly objectionable because these linings are required to be of high density. So far as we are aware at the present time, lime is the only material which will accomplish the purposes of the invention.

The exact mode of action of lime in causing magnesite to set up more quickly with sodium silicate is unknown, but apparently it is necessary that the lime be in the free state. This is evidenced not only by the fact that calcium carbonate and calcium sulfate do not produce the same result, but also by the fact that Austrian magnesites, which set up satisfactorily, usually contain smaller amounts of lime than are present in domestic magnesites. Presumably the lime present in the latter is in combined form so that it is ineffective to produce the results achieved through the practice of this invention with free lime. Whatever the action be, however, free lime when mixed with magnesite of unsatisfactory setting properties accelerates the setting time very substantially. In this manner magnesites whose use would be precluded for some purposes can be easily and cheaply rendered satisfactory for such uses, and without detrimentally affecting the refractory properties of the lining.

According to the provisions of the patent statutes, we have explained the principle and method of practicing our invention and have described what we now consider to represent its best embodiments. However, we desire to have it understood that, within the scope of the appended claims, the invention may be practiced otherwise than as specifically described.

We claim:

1. That method of making a furnace lining comprising forming the lining from a formable mixture of sodium silicate with dead burned magnesite intimately admixed with more than about 0.5 to about 5 per cent of free lime, and firing said lining, after it has set.

2. A method according to claim 1, said free lime content being about 1 to about 3 per cent.

3. That method of making quick setting dead burned magnesite from dead burned magnesite that is slow setting with sodium silicate which comprises intimately mixing said dead burned magnesite with more than about 0.5 per cent to about 5 per cent by weight of free lime, and mixing said mixture with liquid sodium silicate to form a moldable mixture, the resultant mixture setting more rapidly than the same mixture without said free lime.

4. A method according to claim 3 in which said free lime amounts to about 1 to 3 per cent of said dead burned magnesite.

5. A refractory composition comprising an intimate mixture of dead burned magnesite, sodium silicate, and more than about 0.5 per cent to about 5 per cent by weight of free lime, a furnace lining molded from said mixture being quick setting by virtue of the presence of said free lime.

6. A refractory composition comprising an intimate mixture of dead burned magnesite which is slow setting with sodium silicate, sodium silicate, and from about 1 to about 3 per cent of free lime, a furnace lining molded from said mixture being quick setting by virtue of said free lime.

RAYMOND E. BIRCH.
CLYDE L. THOMPSON.